(12) United States Patent
Aggarwal et al.

(10) Patent No.: US 6,415,318 B1
(45) Date of Patent: Jul. 2, 2002

(54) INTER-ENTERPRISE MESSAGING SYSTEM USING BRIDGEHEAD SERVERS

(75) Inventors: Sudhanshu M. Aggarwal, Bellevue; Peter L. Beebee, Redmond; Rajeev Surati, Seattle; Leon C. W. Wong, Redmond; Martin R. Calsyn, Carnation, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/286,257

(22) Filed: Apr. 5, 1999

Related U.S. Application Data

(63) Continuation-in-part of application No. 08/832,758, filed on Apr. 4, 1997, now Pat. No. 5,943,478.

(51) Int. Cl.[7] .............................................. G06F 13/00
(52) U.S. Cl. ....................... 709/206; 709/204; 709/238; 370/230
(58) Field of Search ................................ 709/200, 204, 709/206, 207, 219, 245, 238, 230, 249; 345/741; 713/201; 370/230

(56) References Cited

U.S. PATENT DOCUMENTS

| | | | |
|---|---|---|---|
| 5,550,984 A | | 8/1996 | Gelb ...................... 395/200.17 |
| 5,590,266 A | | 12/1996 | Carson et al. ............... 395/340 |
| 5,699,513 A | | 12/1997 | Feigen et al. .......... 395/187.01 |
| 5,706,507 A | * | 1/1998 | Schloss .................... 707/104.1 |
| 5,799,151 A | * | 8/1998 | Hoffer ......................... 709/204 |
| 5,872,930 A | * | 2/1999 | Masters et al. ............. 709/223 |
| 5,915,008 A | * | 6/1999 | Dulman .................... 379/221.8 |
| 5,920,697 A | * | 7/1999 | Masters et al. ............. 709/219 |
| 5,943,478 A | * | 8/1999 | Aggarwal et al. .......... 713/201 |
| 6,108,704 A | * | 8/2000 | Hutton et al. ............... 709/227 |
| 6,185,184 B1 | * | 2/2001 | Mattaway et al. .......... 370/230 |
| 6,185,603 B1 | * | 2/2001 | Henderson et al. ......... 709/206 |
| 6,233,318 B1 | * | 5/2001 | Picard et al. ............. 379/88.17 |
| 6,260,148 B1 | * | 7/2001 | Aggarwal et al. .......... 713/201 |

OTHER PUBLICATIONS

DellaFerra, et al., "The Zephyr Notification Service," Usernet Conference, Feb. 1988.
LaMacchia, David, "The iFlame Client–Based Instantaneous Datagram Communications Substrate," SB Thesis, Massachusetts Institute of Technology, May 1996.

\* cited by examiner

*Primary Examiner*—Zarni Maung
*Assistant Examiner*—Wen-Tai Lin
(74) *Attorney, Agent, or Firm*—Workman, Nydegger, Seeley

(57) ABSTRACT

Systems and methods for transmitting messages, such as real-time messages, from an entity outside a firewall to a recipient inside the firewall. The messages include the address of a bridgehead server exposed through the firewall and information identifying the recipient client. The network protected by the firewall can include one or more bridgehead servers, one or more messaging servers associated with each bridgehead server, and one or more clients assigned to each messaging server. When a bridgehead server receives a message, it resolves the address of the messaging server to which the recipient client is assigned. The message is forwarded to the messaging server and, in turn, to the recipient client. The sender of the message does not need to know the identity or address of the messaging server. Moreover, the sender, who may reside outside the firewall, does not need direct access to the messaging servers protected by the firewall in order to establish real-time communication with users inside the firewall. Thus, the messaging systems are compatible with conventional network security measures employed by many organizations. The messaging systems can be used by clients to monitor the online status of other clients or to receive notification of properties associated with other clients.

41 Claims, 5 Drawing Sheets

INTER-ENTERPRISE MESSAGING SYSTEM USING BRIDGEHEAD SERVERS

RELATED APPLICATION

This is a continuation-in-part of U.S. patent application Ser. No. 08/832,758, now U.S. Pat. No. 5,943,478 entitled "System for Immediate Popup Messaging Across the Internet," filed Apr. 4, 1997, which is incorporated herein by reference.

BACKGROUND OF THE INVENTION

1. The Field of the Invention

The present invention relates to transmitting electronic messages between enterprises. In particular, the present invention relates to communicating messages from a sender outside of the recipient's network to a bridgehead server inside the recipient's network, where the address of a messaging server associated with the recipient is resolved.

2. The Prior State of the Art

Communication over the Internet takes on several forms, principally e-mail, chat, video and audio. These forms of communication are used in a variety of different contexts. Email is generally not perceived as "real-time" or "immediate"; messages may be read hours or days after they are sent. Chat is principally used as a social medium or for information sharing, not for point-to-point communication. Video and audio are both real-time, but they are both relatively difficult to use, and widespread acceptance requires improvements in existing technology and user interfaces.

Another form of communication that exists on the Internet to a limited extent is instant messaging. For instance, a sending user can send a message to a recipient user, thereby causing the message to almost immediately appear on the computer terminal used by the recipient. The prototypical instant messaging system is the Zephyr system, which has been used on Athena, the campus computer network of the Massachusetts Institute of Technology in Cambridge, Mass. Zephyr permits any Athena user to send popup messages to any other Athena user, but not to any user across the Internet.

Instant messaging differs from chat communication in several respects. First, chat users typically focus their attention on a chat window for the duration of communication while instant messaging users are generally alerted on a per-message basis, allowing them to pay attention to instant messaging only when attention is required. Additionally, the chat model only makes sense for human-to-human communication, while instant messages may be used to transmit notifications from any source, such as a human user, an automated system that send notifications to remote sites, and the like.

Firewalls are machines commonly used for enforcing corporate network security policies; most business users connect to the Internet through a firewall. Firewalls represent a significant impediment to real-time communication between Internet users. Firewall designs generally prohibit external entities on the Internet from directly connecting to internal entities protected by the firewall. While such security mechanisms prevent external entities from maliciously manipulating internal entities, they have had the side effect of preventing asynchronous communication to an internal entity. Existing protocols for real-time Internet messaging are generally incapable of working through a firewall without explicit firewall policy modifications by systems administrators.

As network systems administered by corporate entities and other organizations have grown larger and more widespread, the use of firewalls and related security techniques has increased during recent years. As data transmission rates have increased, the ability to send large amounts of data over the Internet between local area networks has also increased. The fill potential of Internet communication has not been realized, however, because of the inability to securely operate instant messaging systems through firewalls.

SUMMARY AND OBJECTS OF THE INVENTION

The present invention relates to messaging systems that are compatible with firewalls, thereby permitting instant messages to be transmitted over the Internet. According to the invention, a sending client residing at a network administered by a first organization can cause an instant message to appear at a recipient client machine at another network administered by a second organization, even though either (or both) of the organizations may use a firewall to protect its network.

Each network has a hierarchical arrangements of components, including a firewall, one or more bridgehead servers exposed through the firewall, one or more messaging servers each being capable of receiving messages from one or from more than one of the bridgehead servers, and one or more clients assigned to each of the messaging servers. Incoming messages include the address of the bridgehead server and information identifying the recipient client, but do not include the address of the messaging server associated with the recipient client.

Incoming messages are transmitted through the firewall and are received by the bridgehead server to which they are addressed. The bridgehead server resolves the address of the messaging server to which the recipient client is assigned. For instance, the bridgehead server compares the information identifying the recipient client with directory information stored at the network. The directory information can include a database of clients of the network and the messaging server to which each client is assigned. Once the address of the appropriate messaging server is resolved, the message is transmitted to that messaging server and, in turn, to the recipient client.

An outgoing message can bypass any messaging server and bridgehead server associated with the client that sends the message as it is sent across the firewall and to the recipient's bridgehead server. Transmitting outgoing messages in this manner decreases the number of transmission hops that would otherwise be needed if the outgoing message were to pass through the messaging server and the bridgehead server.

The message transmitted in the foregoing manner arrives at recipient client without the sending client knowing the identity or the address of the messaging server associated with the recipient client. Moreover, the sending client does not access the messaging server directly, but instead sends the message to the bridgehead server. The organization in which the recipient client resides can protect its network using a firewall to prevent direct outside access to its messaging servers, while allowing instant or other real-time or rapid messaging systems to operate on its network. These features of the invention provide a desirable degree of security that has not previously been possible in connection with instant messaging. Accordingly, the invention allows real-time messaging to be used in many organizations where it would otherwise not be used without compromising organizational security. The invention also is scalable to substantially any number of users.

A recipient of a message can generate and transmit a response to the message as quickly as desired. Transmission of a response message is similar to that of the original message, with the original recipient client sending the response and the original sending client receiving the response. The client that sends the response (i.e., the original recipient client) does not need to know the address of the messaging server associated with the client that receives the response (i.e., the original sending client). In this manner, two or more clients located remotely with respect to one another can rapidly communicate through firewalls.

Optionally, the invention includes a system for allowing clients to track property changes (such as online status changes) of other clients designated as correspondents. When using the invention to track online status changes of other clients, each client can maintain and display a continuously updated contact list showing the online status of each selected correspondent, thereby allowing the client to know which correspondents are available to engage in real-time communication over the Internet.

The contact list feature of the invention can be implemented by maintaining at the messaging server a subscriber list for a client associated with the messaging server and a given property of that client. The subscriber list includes, for example, entries indicating which of the other clients have designated its client as a correspondent or, in other words, have subscribed to the online status property of its client. When the client logs on to its messaging server, the online status property of the client is modified. The messaging server of the client then refers to the subscriber list for the online status property and notifies each of the clients included in the subscriber list that the particular client is online. Similarly, when the particular client logs off or otherwise goes off line, the messaging server notifies the clients included in the subscriber list.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to transmission of messages, such as real-time or popup messages, from a sending client in one network to a recipient client in another network using techniques that can operate regardless of whether either or both of the networks are protected by a firewall. According to one embodiment of the invention, a bridgehead server that is accessible through a firewall receives the message from the sending client, resolves the address of a messaging server associated with the recipient client, and forwards the message to the messaging server. The sending client can cause the message to arrive at the recipient client by including the address of the bridgehead server and information identifying the recipient client in the message, and does not need to know the identity or address of the messaging server. The use of the bridgehead server prevents entities outside the firewall of the recipient's network from needing direct access to the messaging server, thereby enabling organizations to support real-time messaging over the Internet without compromising organizational or network security.

The invention is described below by using diagrams to illustrate either the structure or processing of embodiments used to implement the systems and methods of the present invention. Using the diagrams in this manner to present the invention should not be construed as limiting of its scope. The embodiments of the present invention may comprise a computer network adapted to perform the functions disclosed herein or a special purpose or general purpose computer including various computer hardware, as discussed in greater detail below.

Embodiments within the scope of the present invention also include computer readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
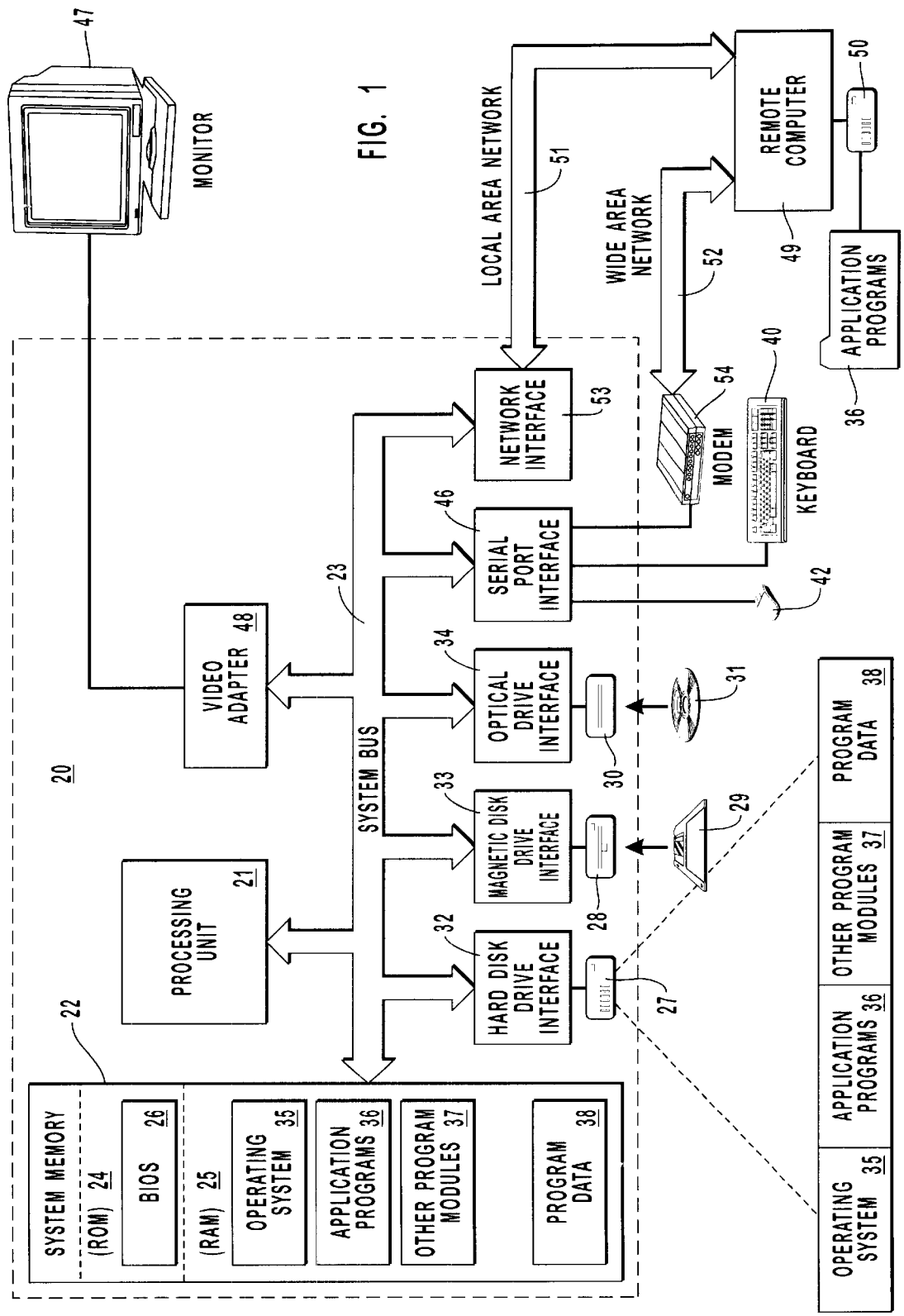
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communications network. In a distributed computing environment, program modules may be located in both local and remote memory storage devices. With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk, a removable magnetic disk 29 and a removable optical disk 31, other types of computer readable media for storing data can be used, including magnetic cassettes, flash memory cards, digital video disks, Bernoulli cartridges, RAMs, ROMs, and the like.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Message Transmission

Figure 2:
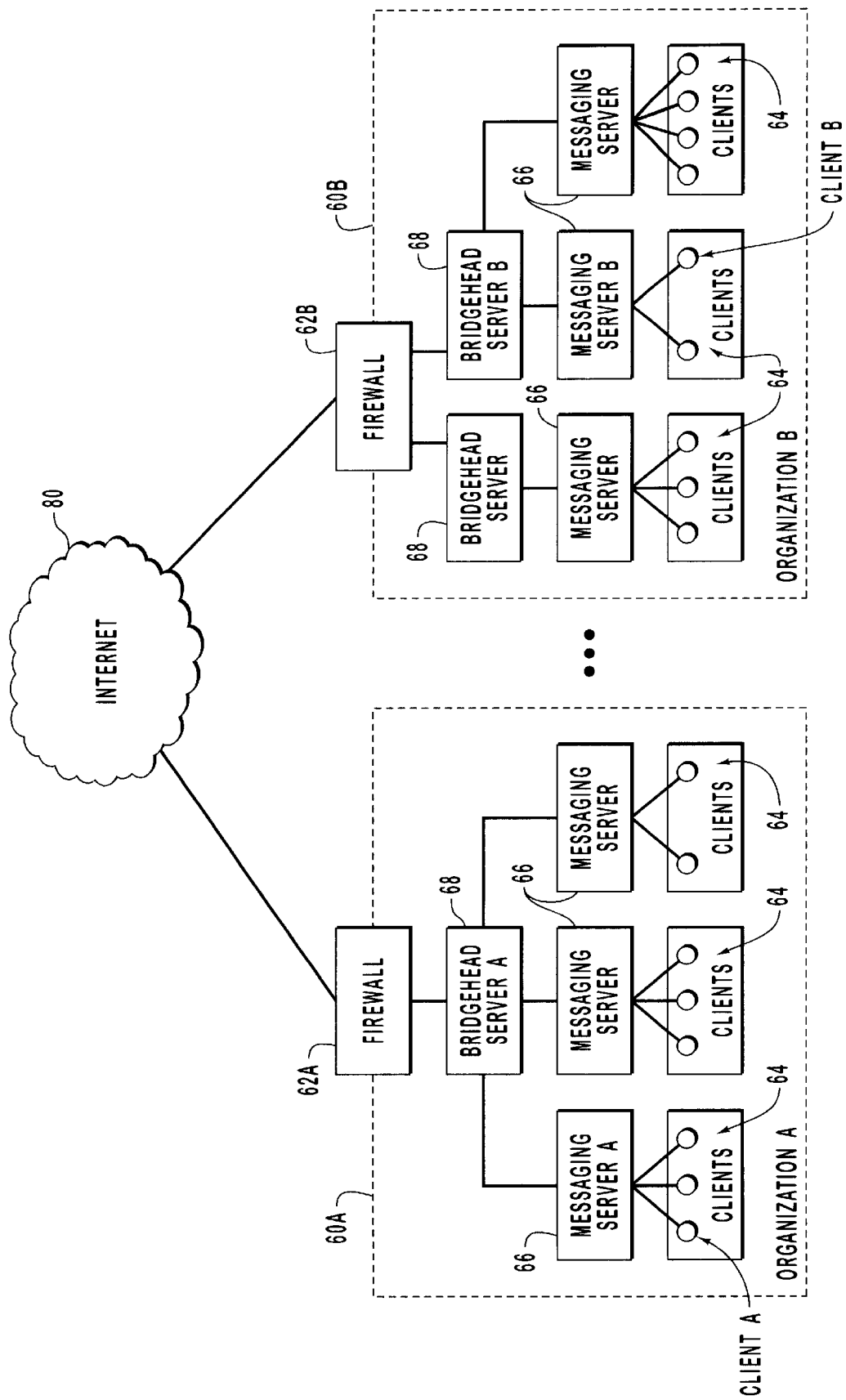
FIG. 2 is a schematic diagram illustrating a suitable network environment, including networks operated by different organizations, in which the invention can be implemented.

FIG. 2 illustrates an exemplary network environment or messaging system in which the invention can be implemented. In FIG. 2, organization A administers a network 60A, while organization B administers a network 60B. Networks 60A and 60B each have access to the Internet 80 or another communication network capable of transmitting messages between networks. While only two organizations and their associated networks are illustrated in FIG. 2, the invention is scalable to any number of networks, organizations, or clients.

Network 60A is protected by firewall 62A, while network 60B is protected by firewall 62B. As used herein, the term "firewall" is to be broadly defined. Firewalls are defined to include any network node that controls or restricts the ability of an entity outside the node to communicate with network components inside the node. Firewalls also often restrict the ability of network components inside the firewall from communicating with outside entities. In the network environment of FIG. 2, components residing in network 60A are inside firewall 62A, while other components of FIG. 2 are outside the firewall. Firewalls can be implemented in routers or in general purpose or special purpose computing devices in ways that are understood by those skilled in the art. While FIG. 2 illustrates firewalls 62 being implemented at networks 60A and 60A, the principles disclosed herein can optionally be practiced in the absence of firewalls. For instance, organization B might be an Internet service provider that is not protected by a firewall. In this case, the bridgehead servers in organization B might redirect connecting clients to the appropriate messaging servers instead of forwarding incoming requests.

The line segments connecting various network components in FIG. 2 represent the hierarchical relationships between components, and do not necessarily denote communication paths. Each network 60 includes one or more clients 64 that operate client software for generating, storing and displaying messages and for performing any other desired functions in relation to the messages. Clients 64 can constitute any desired computing or communication device that is capable of generating, storing, or displaying messages. Moreover, the term "clients" extends to any computing or communication device, whether associated with a human user, fully automated, or some combination of human-assisted and automated. The principles disclosed herein are generally applicable to processes and systems for sending messages from one networked site to another, regardless of the identity of the sender or the recipient. For example, messaging transmitted according to the invention can be between two users operating clients, thereby enabling real-time communication between the users. In another example, the sending client is a computing or communication device that automatically generates messages relating to the stock market and transmits them to recipients according to the techniques disclosed herein. In general, messages can be created according to any desired manner and can be transmitted between any desired clients.

Each client 64 is assigned to one of any number of messaging servers 66 that reside in network 60. Messaging servers 66 can be substantially any network server that is capable of distributing messages to clients 64. As shown in FIG. 2, each network 60 can have multiple messaging servers 66, with each messaging server being associated with multiple clients 64. It is also possible to have a client that registers directly to the bridgehead server, foregoing an intermediate messaging server. In this alternative embodiment, the client performs any necessary functions that would otherwise be performed by its messaging server.

In one embodiment, messaging servers 66 monitor the current online status of the associated clients 64, manage all communication to and from the clients, and store messages that are intended for the clients but cannot be immediately delivered (e.g., if a recipient client is not online when a message is sent). Each client of messaging server 66 can have a contact list and a subscriber list. The contact list includes all other users that a particular client has designated as "correspondents" that the client wishes to regularly keep in touch with. The subscriber list includes all other clients that have designated the particular client as a correspondent. Contact lists, subscriber lists, and related functions of messaging servers will be described in greater detail herein in reference to FIG. 5.

Each network 60 further includes one or more bridgehead servers 68. The bridgehead servers can also be substantially any network server that is adapted to perform the functions that will be described in greater detail in reference to FIG. 4. Bridgehead servers 68 are exposed through the corresponding firewall 62 in the sense that entities outside the network and outside the firewall can address a message to the bridgehead server and cause the message to be received thereby, Each bridgehead server is associated with a pool of one or more of the messaging servers 66. Moreover, any given messaging server 66 might receive messages from only a single bridgehead server or from multiple bridgehead servers, depending on which pool of messaging servers it is included in and the composition of the associated pool of bridgehead servers. In many cases, all bridgehead servers in an organization are capable of passing messages to all messaging servers.

Figure 3:
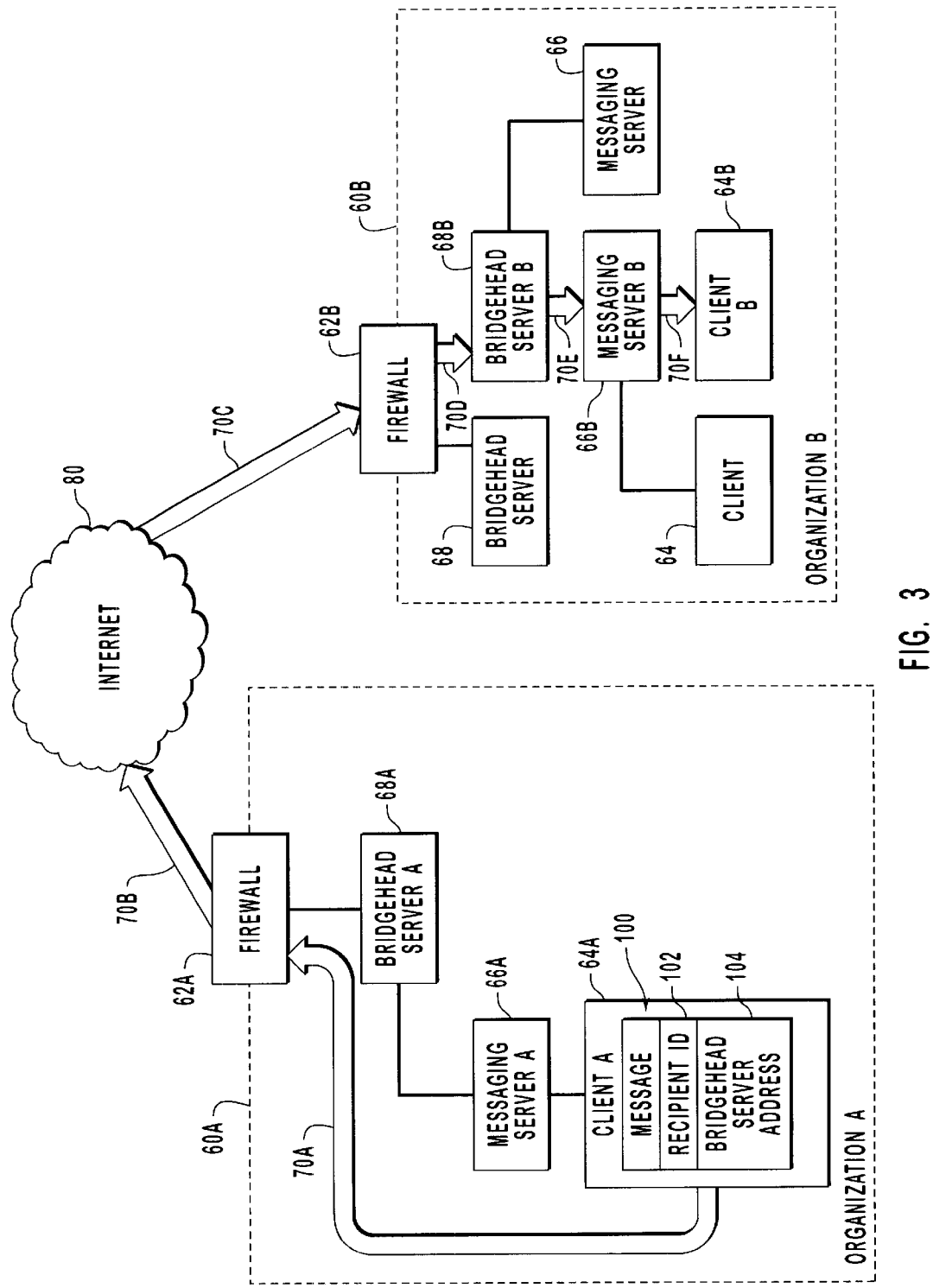
FIG. 3 is a schematic diagram illustrating the route by which a message is transmitted from a sending client to a recipient client in the network environment of FIG. 2 according to one embodiment.

Selected network components of FIG. 2 are designated as client A, messaging server A, bridgehead server A, bridgehead server B, message server B, and client B. These designations are used in FIG. 3 to describe one example of the path of a message as it is transmitted from a sending client to a recipient client. FIG. 3 represents the network environment of FIG. 2, and shows only the network components that are useful in describing the path of the message according to a specific example.

In this example, the user associated with client A (64A) decides to send a message 100, which may be an instant or real-time message, to client B (64B) at organization B. Thus, for purposes of message 100, client A is a sending client, while client B is a recipient client. Any given client can alternately be a sending client as it transmits a message and a recipient client as it receives a message. As shown in FIG. 3, client B is assigned to messaging server B (66B), and receives messages and, possibly, other network services from messaging server B. Because messaging server B and other messaging servers 66 can provide general network services to their clients, these messaging servers may store proprietary or sensitive information. For this or for other reasons, organization B may be unwilling to allow entities outside firewall 62B to have direct access to messaging server B or any other messaging server 66. This can be one of the principal reasons for which firewall 62B is used by organization B. Moreover, security issues associated with messaging servers 66 and other network servers have been largely responsible for the previous general unavailability of instant messaging over the Internet between organizations.

In addition to the security and firewall-compatibility benefits, bridgehead servers allow clients hosted on multiple messaging servers to be easily contacted, because all the messaging servers have addresses at the bridgehead server. This permits load-balancing across many messaging servers and allows messaging servers to be geographically distributed without exposing this complexity to outside message senders. The use of bridgehead servers further allows clients to be identified by outsiders according to a relatively permanent address (i.e., the bridgehead server address), which remains valid even though the actual address of the client or the client's messaging server may change over time.

Bridgehead server B (68B) and other bridgehead servers 68 in the network environment allow real-time messages to be sent to message servers 66 without allowing entities outside the corresponding firewall 62 to directly access the messaging server 66 associated with the recipient client. Moreover, the sending client does not need to know the identity or the address of the messaging server 66 associated with the recipient client. Indeed, the addresses of the messaging servers do not need to be published outside of the firewall.

In the example of FIG. 3, client A composes message 100 and includes therein information 102 identifying recipient client B and the address 104 of a pool of one or more bridgehead servers at network 60B, any of which is capable of distributing messages to client B. Because a "pool" of bridgehead servers can include a single bridgehead server or multiple bridgehead servers, address 104 is accurately described as relating to a pool, regardless of whether there is only one or more than one bridgehead server at network 60B that has the address. In the illustrated example, client A includes a recipient client identifier 102 identifying client B and the address 104 of bridgehead server B in message 100.

Referring to FIG. 2, bridgehead server B serves as a common address for all clients 64 that are linked thereto in the hierarchical structure. From the standpoint of client A, the step of including recipient client identifier 102 and the address 104 of bridgehead server B could merely involve selecting the name of client B from an address book or otherwise addressing message 100 in ways that are easily understood by Internet users. Moreover, recipient client identifier 102 and bridgehead server address 104 can be implemented using conventional Internet resource location protocols that have been adapted to support the invention, and which will be understood by those skilled in the art Upon learning of the disclosure made herein.

Turning again to FIG. 3, the path of message 100 as it is transmitted from client A to client B is represented by the directional arrows designated as 70A–F. Message 100 can be directly transmitted from client A to firewall 62A as shown at 70A, bypassing the messaging server A and bridgehead server A that are otherwise associated with client A. Bypassing these network components further reduces transmission latency. Alternately, however, the path of message 100 between client A and firewall 62A can pass through either or both of messaging server A and bridgehead server A.

Message 100 is then transmitted over the Internet 80 to network 60B as shown at 70B and 70C. Bridgehead server B is exposed through firewall 62B in the sense that incoming communication addressed to bridgehead server B is generally authorized to pass through firewall 62B. Thus, message 100 arrives at bridgehead server B through firewall 62B as shown at 70D.

As previously, noted, the invention can be practiced in the absence of a firewall 62B at the recipient client's network. In this situation, bridgehead server B can forward messages to the appropriate messaging server 66 as has been described. Alternately, in the absence of a firewall, bridgehead server B can notify the sending client A of a direct address of the recipient client B, thereby enabling client A to directly send messages to client B.

Figure 4:
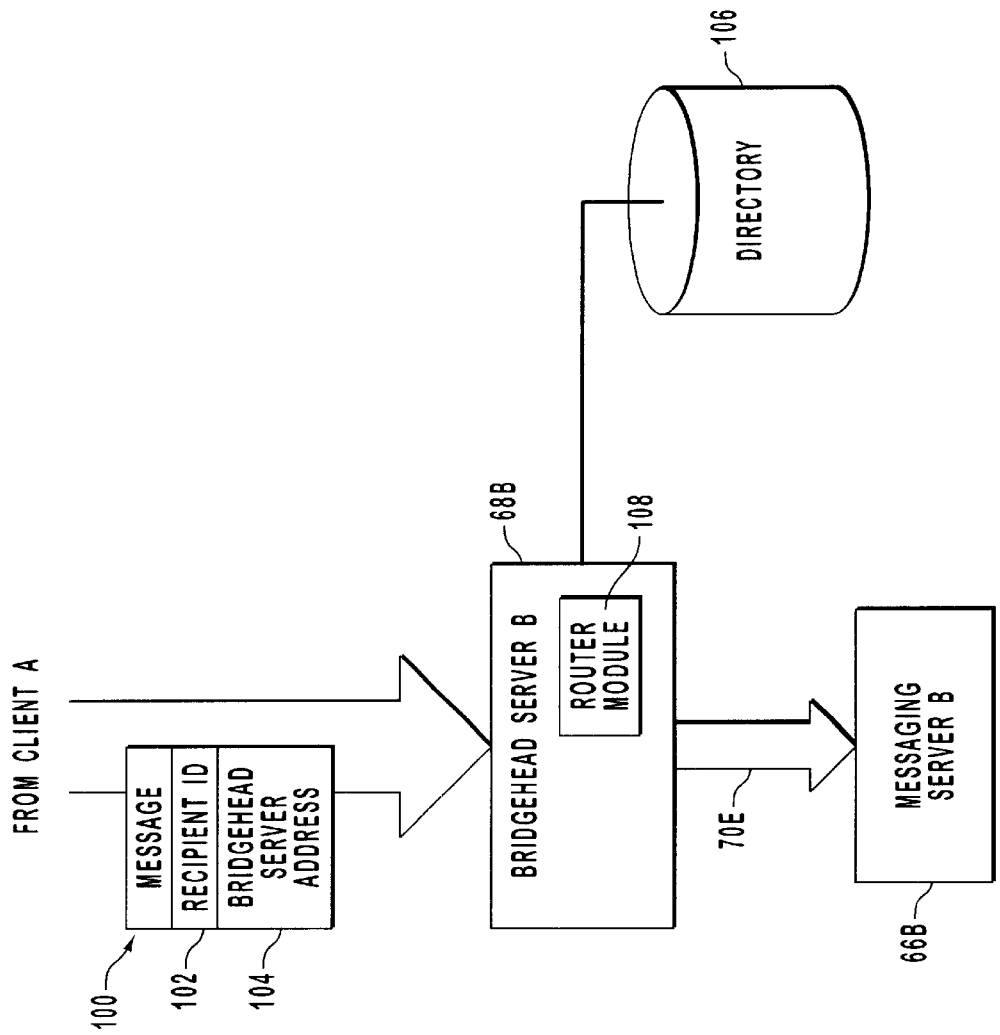
FIG. 4 is a schematic diagram showing a bridgehead server as it resolves the address of a messaging server associated with the recipient client.

FIG. 4 illustrates the processing that is performed at bridgehead server B upon receipt of a message according to one embodiment of the invention. Message 100 includes the recipient identifier 102 and the bridgehead address 104 that were designated by the sending client. Upon receiving message 100, bridgehead server B resolves the address of messaging server B based, at least in part, on recipient identifier 102. For example, bridgehead server B has a corresponding directory 106 that includes directory information wherein the clients that are associated with bridgehead server B are referenced with the messaging servers to which they are assigned. Thus, bridgehead server B can compare recipient identifier 102 with the directory information included in directory 106, thereby identifying messaging server B as the destination to which message 100 will be forwarded and locating the unique address associated with messaging server B. Once the address of messaging server B has been resolved, a routing module 108 or another component of bridgehead server B causes message 100 to be transmitted to messaging server B as shown at 70E.

Referring again to FIG. 3, messaging server B, having received message 100, transmits the message to client B if client B is online. Because messaging server B may be assigned to multiple clients 64, messaging server B resolves the identity of the recipient client (e.g., client B) using recipient client identifier 102 or by any other desired means. When client B receives message 100, it can open a popup window on the user's screen using standard user interface techniques. For instance, on Windows systems, client B can all functions resident in the Microsoft Foundation Classes (MFC) supplied by Microsoft Corp. of Redmond, Washington, to create a window of a specified size, display it on the screen, overlay it on top of the other applications, and paint the message content as well as some action buttons (e.g. "Done", "Reply", etc.) on the window. Alternately, client B can sound an audible signal or perform any other action to notify the user of message 100.

Client B can then process message 100 as desired, including possibly sending a response to the message. When client B sends a response to message 100, client B becomes the sending client, while client A becomes the recipient client. The response can be it transmitted in substantially the same manner from client B to client A as original message 100 was sent from client A to client B as shown in FIG. 3. In other words, client B composes a message in response to original message 100, includes therein the address of bridgehead server A and a recipient client identifier designating client A as the recipient, and sends the response through the Internet to network 60A. The path of the response can be similar to path 70A–F in that it can bypass message server B and bridgehead server B at network 60B. Transmitting messages and responses in this manner enables clients A and B to engage in two-way, real-time communication through firewalls 62.

Notification of Client Status and Properties

Figure 5:
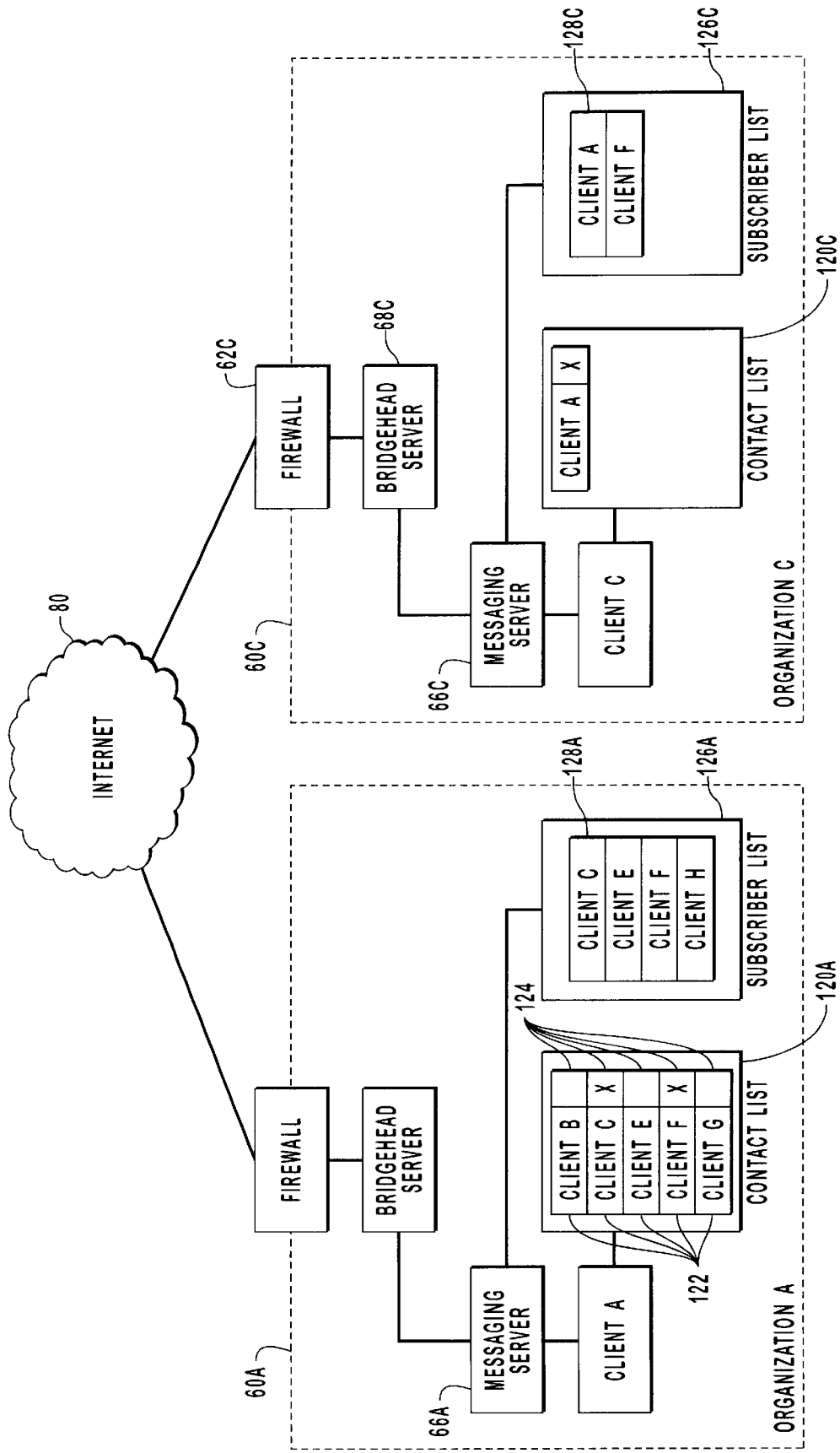
FIG. 5 is a schematic diagram depicting one embodiment of a system for maintaining contact lists showing the online status of clients in the networked environment.

The technique whereby contact lists are maintained for the clients of messaging servers 66 is illustrated in FIG. 5. Contact lists enable clients to monitor properties associated with other clients or with events or conditions in the environment of other clients. The properties can be as varied as the online status of the client, the value of a stock, the physical condition of a person monitored with medical equipment, the amount of product with which a vending machine is stocked, or any other measurable condition that might be imagined. Thus, the invention enables event-driven notifications to be instantly communicated from one network to another, even if one or both of the networks are protected by firewalls. Although the use of contact lists and the techniques for monitoring properties of other clients is primarily disclosed herein in the context of the online status of clients, the principles can be generally applied to tracking the status of any desired property.

Referring now to the example of online status of clients, contact lists enable users of clients to know whether potential recipient clients are online. If a recipient client is online, the recipient can promptly read and respond to messages, thereby allowing real-time communication to be established over the Internet between clients at different networks and organizations. Notification of changes in the online status of clients (and notification of any desired property) can be communicated from one network to another in substantially the same manner as the other instant messages disclosed herein. Specifically, the notification can be sent to a bridgehead server at the recipient's network, and is then appropriately forwarded to the recipient according to the methods disclosed herein in reference to message transmission.

Contact lists 120 of FIG. 5 are akin to a phone book that is initially empty and gradually accumulates contact information for correspondents of the associated client. For instance, as client A corresponds with other clients or as client A decides to add a correspondent to contact list 120A, entries 122 are added to the contact list. In this example, client A has designated clients B, C, E, F, and G as correspondents, and corresponding entries 122 have been added to contact list 120. These clients can be associated with the same messaging server or the same bridgehead server as client A, or instead may reside a different network than client A. Client C resides at network 60C administered by organization C, while the other clients, namely clients B, E, F, G, and H are not illustrated in FIG. 5.

Each entry 122 is associated with an online status property 124, the value of which indicates whether the correspondent is online. For instance, in FIG. 5, client entries 122 of contact list 120A designating clients C and F have an online status property 124 indicating that the clients are online (shown by "x"). In contrast, client entries 122 that designate clients B, E, and G have an online status property 124 indicating that these clients are not online (shown by the absence of "x"). By referring to contact list 120, the user of client A can immediately know whether particular correspondents are online and therefore available to engage in real-time communication over the Internet.

The values of online properties 124 are set in cooperation with a subscriber list managed by the messaging server associated with the clients designated by client entries 122 and the online status property. For example, subscriber list 126C associated with client C has an entry 128C indicating that client A has subscribed to the online status property of client C (because client a has designated client C as a correspondent). Entry 128C is used by messaging server 66C to notify messaging server 66A each time the online status property of client C changes (because client C logs on or logs off), thereby allowing client A to update its contact list 120A. Similarly, client C has designated client A as a correspondent in its contact list 120C. Accordingly, subscriber list 126A includes an entry 128A indicating that client C has subscribed to the online status property of client A.

When a client logs on to its messaging server, the messaging server refers to the subscriber list associated with the client to determine which other clients naive designated the client as a correspondent. In the example of FIG. 5, client A logs on to messaging server 66A. Messaging server 66A then refers to subscriber list 126A and finds that client C has subscribed to the online status property of client A. Messaging server 66A then sends notification of the online status of client A to messaging server 66C by way of bridgehead server 68C. The notification is sent through firewall 62C to bridgehead server 68C in a similar fashion as messages (e.g., message 100 of FIG. 4) are sent to a bridgehead server. Moreover, bridgehead server 68C resolves the address of messaging server 66C according to the address resolution techniques disclosed herein. In this manner, messaging server 66A can notify messaging server 66C of the online status of client A over the Internet and through firewall 62C without having to know the identity or address of messaging server 66C. The entry associated with client A at contact list 120C is updated to show that client A is logged on to its messaging server. When client A logs off or otherwise is disconnected from message server 66A, message server 66A sends notification of this event to messaging server 66C by way of bridgehead server 68C. The online status of client A can thereby be communicated or continuously displayed to the user of client C such that the user of client C knows when client A is available to engage in real-time communication. Subscriber list 126C can be used in a like manner to update the online status of client C at contact list 120A.

The contact list entries 122 can be created by the user of the associated client as desired as the user designates clients as correspondents. Alternately, an entry 122 can be created for a recipient client each time the client sends a message to a new recipient client. In either case, after being initially added to a contact list, entries 122 remain on the list unless explicitly removed by the client. Thus, the contact list can be persistent through logoffs and subsequent logins. The location of contact lists 120 and subscriber lists 126 is not critical. For example, while contact lists 120A and 120C are illustrated in FIG. 5 as being located at clients A and C, respectively, the contact lists can instead be stored at another network location. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a messaging system implemented in a network environment, a method for allowing an instant message from a sending client residing at a first network to be received by a recipient client residing at a second network, the second network including a firewall which prohibits instant messaging directed to either specific clients or specific messaging servers, the method comprising acts of:

providing a pool of one or more bridgehead servers at the second network to receive instant messages on behalf of the recipient client, wherein the firewall at the second network allows instant messaging that is directed to the pool of one or more bridgehead servers;

receiving an instant message from the first network at the pool of one or more bridgehead servers, the message including an address of the pool and information identifying the recipient client;

identifying, at the bridgehead server, a messaging server residing at the second network and being associated with the recipient client; and transmitting the message from the bridgehead server to the messaging server for delivery to the recipient client.

2. A method as defined in claim 1, further comprising an act or generating lie message by the sending client.

3. A method as defined in claim 1, wherein the instant message comprises a notification of a property associated with the sending client.

4. A method as defined in claim 3, wherein the property relates to an online status of the sending client.

5. A method as defined in claim 3, wherein the property relates to an event in the environment of the sending client.

6. A method as defined in claim 2, wherein generating the instant message by the sending client comprises an act of including, by the sending client, the address of the pool of one or more bridgehead servers and the information identifying the recipient client in the instant message.

7. A method as defined in claim 6, wherein including the address of the pool of one or more bridgehead servers and the information identifying the recipient client in the instant message is conducted without the sending client knowing the identity of the messaging server associated with the recipient client.

8. A method as defined in claim 6, wherein a local messaging server at the first network is associated with the sending client and is capable of distributing messages to the sending client, the method further comprising an act of transmitting the instant message from the sending client to a local firewall at the first network, the message bypassing the local messaging server.

9. A method as defined in claim 1, wherein identifying the messaging server comprises an act of comparing the information identifying the recipient client with directory information stored at the second network.

10. A method as defined in claim 1, further comprising an act of transmitting a response to the instant message from the recipient client to tie sending client.

11. A method as defined in claim 10, wherein the response bypasses both the messaging server associated with the recipient client and the bridgehead server at the second network during tie act of transmitting the response.

12. A method as defined in claim 1, wherein receiving the instant message from the first network and transmitting the message from the bridgehead server are conducted such that the instant message is received by the recipient client from the sending client in real time.

13. A method as defined in claim 1, further comprising an act of conveying a notification to a user of the recipient client.

14. A method as defined in claim 1, wherein the sending client is a machine, the act of receiving the instant message comprising an act of receiving an automated asynchronous message from the machine.

15. In a messaging system implemented in a network environment including a sending client residing at a first network and a recipient client residing at a second network protected by a firewall, wherein a messaging server at the second network distributes messages to the recipient client, and wherein the firewall prohibits real-time messaging directed to either specific clients or specific messaging servers, a method for receiving a real-time message at the recipient client without the sending client knowing the identity of the messaging server, comprising acts of:

exposing through the firewall, a pool of one or more bridgehead servers at the second network to receive real-time messages on behalf of the recipient client such that the firewall at the second network allows real-time messaging which is directed to the pool of one or more bridgehead servers;

receiving a real-time message from the sending client at a bridgehead server included in the pool of one or more bridgehead servers, the real-time message including information that identified the recipient client without including an address of the messaging server that is associated with the recipient client;

at the bridgehead server, resolving the address of the messaging server based at least in part on the information identifying the recipient client; and sending the real-time message from the bridgehead server to the messaging server.

16. A method as defined in claim 15, further comprising an act of transmitting the real-time message from the messaging server to the recipient client.

17. A method as defined in claim 15, wherein the address of the messaging server associated with the recipient client is not published outside of the firewall.

18. A method as defined in claim 15, wherein resolving the address of the messaging server comprises an act of comparing the information identifying the recipient user with directory information stored at the second network.

19. A method as defined in claim 15, wherein the first network is protected by a first firewall and includes a first messaging server that distributes messages to the sending client, the method further comprising acts of:

generating, by the recipient client, a response to the real-time message, wherein the response includes an address of a first bridgehead server at the first network and information identifying the sending client, but does not include an address of the first messaging server;

transmitting the response from the recipient client to the first bridgehead server included in the first network;

transmitting the response from the first bridgehead server to the first messaging server at the first network; and transmitting the response from the first messaging server to the sending client.

20. A method as defined in claim 19, further comprising an act of resolving tie address of tie first messaging server at the first bridgehead server.

21. A method as defined in claim 15, further comprising an act of monitoring, by the messaging server, the online status of the sending client.

22. A method as defined in claim 21, wherein monitoring the online status of the sending client comprises acts of:

maintaining a subscriber list at a first messaging server associated with the sending client at the first network, the subscriber list including an entry indicating that the recipient client is subscribed to an online status property of the sending client;

when the online status property of the sending client changes, referring to the subscriber list and sending notification to the messaging server at the second network based on the entry; and updating a contact list maintained for the recipient client at the second network in response to the notification.

23. A networked system for receiving an instant message sent from a sending client outside the networked system to a recipient client inside the networked system, comprising:

one or more clients;

one or more messaging servers, each having at least one of the one or more clients assigned thereto and being capable of distributing incoming instant messages to said at least one of the one or more clients;

a bridgehead server that receives instant messages on behalf of the one or more clients, the bridgehead server including means for resolving an address of the messaging server to which a particular client is assigned when the bridgehead server receives a message to be transmitted to the particular client; and a firewall that prevents instant messaging directed to either the one or more clients or the one or more messaging servers, but supports instant messaging directed to the bridgehead server.

24. A networked system as defined in claim 23, wherein the means for resolving the address comprises:

a unique address for each of the one or more messaging servers; and information specifying to which of the one or more messaging servers each of the one or more clients is assigned.

25. A networked system as defined in claim 23, further comprising a plurality of bridgehead servers.

26. A networked system as defined in claim 25, wherein each bridgehead server of the plurality of bridgehead servers is capable of transmitting messages to each of the one or more messaging servers.

27. A networked system as defined in claim 25, wherein a first bridgehead server of the plurality of bridgehead servers is capable of transmitting messages only to a first pool of messaging servers selected from the one or more messaging servers and a second bridgehead server of the plurality of bridgehead servers is capable of transmitting messages only to a second pool of messaging servers that is different from the first pool of messaging servers.

28. For a messaging system implemented in a network environment, a computer program product carrying computer executable instructions that implement a method of allowing an instant message from a sending client residing at a first network to be received by a recipient client residing at a second network, wherein the second network includes a firewall which prohibits instant messaging directed to either specific clients or specific messaging servers, the method comprising acts of:

providing a pool of one or more bridgehead servers at the second network to receive instant messages oil behalf of the recipient client, wherein the firewall at the second network allows instant messaging that is directed to the pool of one or more bridgehead servers;

receiving an instant message from the first network at the pool of one or more bridgehead servers, the message including an address of tie pool and information identifying the recipient client;

identifying, at the bridgehead server, a messaging server residing at the second network and being associated with the recipient client; and transmitting the message from the bridgehead server to the messaging server for delivery to the recipient client.

29. A computer program product as defined in claim 28, wherein the instant message comprises a notification of a property associated with the sending client.

30. A computer program product as defined in claim 29, wherein the property relates to at least one of (i) an online status of the sending client, and (ii) an even in the environment of the sending client.

31. A computer program product as defined in claim 28, wherein identifying the messaging server comprises an act of comparing the information identifying the recipient client with directory information stored at the second network.

32. A computer program product as defined in claim 28, the method further comprising all act of transmitting a response to the instant message from the recipient client to the sending client.

33. A computer program product as defined in claim 32, wherein the response bypasses both the messaging server associated with the recipient client and the bridgehead server at the second network during the act of transmitting the response.

34. A method as defined in claim 32, the method further comprising an act of conveying a notification to a user of the recipient client.

35. A method as defined in claim 32, wherein the sending client is a machine, and wherein the act of receiving the instant message comprises an act of receiving an automated asynchronous message from the machine.

36. For a messaging system implemented in a network environment including a sending client residing at a first network and a recipient client residing at a second network protected by a firewall, wherein a messaging server at the second network distributes messages to the recipient client and wherein the firewall prohibits real-time messaging directed to either specific clients or specific messaging servers, a computer program product carrying computer executable instructions that implement a method for receiving a real-time message at the recipient client without the sending client knowing die identity of the messaging server, the method comprising acts of:

exposing through the firewall, a pool of one or more bridgehead servers at the second network to receive real-time messages on behalf of the recipient client such that the firewall at the second network allows real-time messaging which is directed to the pool of one or more bridgehead servers;

receiving a real-time message from the sending client at a bridgehead server included in the pool of one or more bridgehead servers, the real-time message including information that identifies the recipient client without including an address of the messaging server that is associated with the recipient client;

at the bridgehead server, resolving the address of the messaging server based at least in part on the information identifying the recipient client; and sending the real-time message from the bridgehead server to the messaging server.

37. A computer program product as defined in claim 36, wherein the address of the messaging server associated with the recipient client is not published outside of the firewall.

38. A computer program product as defined in claim 36, wherein resolving the address of the messaging server comprises an act of comparing the information identifying the recipient user with directory information stored at the second network.

39. A computer program product as defined in claim 36, the method further comprising an act of monitoring, by the massaging server, the online status of the sending client.

40. In a messaging system implemented in a network environment, a method for transmitting a message from a sending client residing at a first network to a recipient client residing at a second network, wherein a local messaging server at the first network is associated with the sending client and is capable of distributing messages to the sending client, the method comprising the steps of:

generating a message by the sending client comprising the step of including, by the sending client, an address of a pool of one or more bridgehead servers and information identifying the recipient client in the message;

transmitting the message from the sending client to a local firewall at the first network, the message bypassing the local messaging server;

transmitting the message from the first network to a bridgehead server included in the pool of one or more bridgehead servers at the second network;

identifying, at the bridgehead server, a messaging server residing at the second network and being associated with the recipient client;

transmitting the message from the bridgehead server to the messaging server; and transmitting the message from the messaging server to the recipient client.

41. In a messaging system implemented in a network environment, a method for transmitting a message from a sending client residing at a first network to a recipient client residing at a second network, comprising the steps of:

transmitting a message from the first network to a bridgehead server included in a pool of one or more bridgehead servers at the second network, the message including an address of the pool and information identifying the recipient client;

identifying, at the bridgehead server, a messaging server residing at the second network and being associated with the recipient client;

transmitting the message from the bridgehead server to the messaging server;

transmitting the message from the messaging server to the recipient client; and transmitting a response to the message from the recipient client to the sending client, wherein the response bypasses both the messaging server associated with the recipient client and the bridgehead server at the second network during the step of transmitting the response.

\* \* \* \* \*

UNITED STATES PATENT AND TRADEMARK OFFICE
CERTIFICATE OF CORRECTION

PATENT NO. : 6,415,318 B1
DATED : July 2, 2002
INVENTOR(S) : Aggarwal et al.

It is certified that error appears in the above-identified patent and that said Letters Patent is hereby corrected as shown below:

Column 2,
Line 7, change "fill" to -- full --
Line 24, change "arrangements" to -- arrangement --
Line 55, after "at" insert -- the --

Column 5,
Line 23, start a new paragraph with "With"

Column 6,
Line 63, change "60A," to -- 60B, --

Column 7,
Line 61, change "thereby," to -- thereby. --

Column 9,
Line 13, change "Upon" to -- upon --

Column 10,
Line 14, delete "it"

Column 11,
Line 26, change "client a" to -- client A --
Line 38, change "naive" to -- have --

Column 12,
Line 42, change "or" to -- of --
Line 42, change "lie" to -- the --

Column 13,
Lines 7 and 11, change "tie" to -- the --
Line 43, change "identified" to -- identifies --

Column 14,
Line 10, change both occurrences of "tie" to -- the --

Column 15,
Line 15, change "tie" to -- the --
Line 33, change "all" to -- an --
Line 58, change "die" to -- the --

UNITED STATES PATENT AND TRADEMARK OFFICE
CERTIFICATE OF CORRECTION

PATENT NO.    : 6,415,318 B1
DATED         : July 2, 2002
INVENTOR(S)   : Aggarwal et al.

It is certified that error appears in the above-identified patent and that said Letters Patent is hereby corrected as shown below:

<u>Column 16,</u>
Line 20, change "massaging" to -- messaging --

Signed and Sealed this

Twelfth Day of August, 2003

JAMES E. ROGAN
*Director of the United States Patent and Trademark Office*